United States Patent
Zimmer

(10) Patent No.: US 7,079,013 B2
(45) Date of Patent: Jul. 18, 2006

(54) DEVICE FOR THE INDUCTIVE TRANSMISSION OF ENERGY AND/OR DATA

(75) Inventor: Herbert Zimmer, Regensburg (DE)

(73) Assignee: Siemens Aktiengesellschaft, Munich (DE)

( * ) Notice: Subject to any disclaimer, the term of this patent is extended or adjusted under 35 U.S.C. 154(b) by 259 days.

(21) Appl. No.: 10/833,909

(22) Filed: Apr. 28, 2004

(65) Prior Publication Data

US 2004/0201468 A1 Oct. 14, 2004

Related U.S. Application Data

(63) Continuation of application No. PCT/EP03/09237, filed on Aug. 20, 2003.

(30) Foreign Application Priority Data

Sep. 9, 2002 (EP) ................................ 02020185

(51) Int. Cl.
*G05B 11/01* (2006.01)
(52) U.S. Cl. ............ 340/310.17; 340/538; 340/538.16; 340/310.11
(58) Field of Classification Search ................ 340/538, 340/538.16, 310.11, 310.17
See application file for complete search history.

(56) References Cited

U.S. PATENT DOCUMENTS

| | | | | |
|---|---|---|---|---|
| 4,035,745 A | * | 7/1977 | Doetsch et al. ............. | 331/114 |
| 5,479,171 A | | 12/1995 | Schuermann ................ | 342/44 |
| 5,491,483 A | | 2/1996 | D'Hont ...................... | 342/42 |
| 5,517,400 A | * | 5/1996 | Esser .......................... | 363/89 |
| 6,269,728 B1 | * | 8/2001 | Kern et al. ................. | 89/28.05 |

FOREIGN PATENT DOCUMENTS

| | | |
|---|---|---|
| DE | 197 03 029 A1 | 7/1998 |
| WO | WO 97/49076 | 12/1997 |

* cited by examiner

*Primary Examiner*—Daryl C Pope
(74) *Attorney, Agent, or Firm*—Baker Botts L.L.P.

(57) ABSTRACT

The device has a primary circuit (1) that transmits energy or data via an intermediate circuit (2) to a secondary circuit (3) by means of induction. The intermediate circuit (2) has a very low quality factor. The inductive coupling between the intermediate circuit (2) and the secondary circuit (3) is reduced by inserting an additional leakage inductor ($L_s$) so that energy or data is transmitted from the primary circuit (1) to the secondary circuit (3) as effectively as possible. This has the effect of lessening the damping effect of the intermediate circuit (2) on the secondary circuit (3).

12 Claims, 4 Drawing Sheets

DEVICE FOR THE INDUCTIVE TRANSMISSION OF ENERGY AND/OR DATA

CROSS REFERENCE TO RELATED APPLICATION

This application is a continuation of copending International Application No. PCT/EP03/09237 filed Aug. 20, 2003 which designates the United States, and claims priority to European application no. 02020185.1 filed Sep. 9, 2002.

TECHNICAL FIELD OF THE INVENTION

The invention relates to a device for the inductive transmission of energy and/or data from a primary circuit via an intermediate circuit to a secondary circuit.

DESCRIPTION OF THE RELATED ART

A device of a similar nature is disclosed, for example, in patent specification U.S. Pat. No. 5,491,483 A. This device has a base station (primary circuit) that transmits query signals and is able to receive response signals via an antenna. A transponder that automatically sends a response signal in reply to query signals received has an intermediate circuit that forms the antenna of the transponder. The antenna is connected via an impedance transformer to a tuned circuit (secondary circuit). The impedance transformer serves to adapt the low impedance of the antenna to the high impedance of the tuned circuit. This device transmits energy to the transponder, stores it temporarily at the transponder in an energy store and then uses this energy to help send a response signal back to the base station.

The input voltage of the transponder should be as high as possible when the query signal is received in order that the energy store is as well charged as possible. However the low quality factor of the intermediate circuit (ring antenna) exerts a strong damping effect on the secondary circuit through the inductive connection, so prior efforts have concentrated on enhancing transmission by improving the connection of the circuits. Lower resistance antennas or antenna coils with multiple windings, for example, can be used for this purpose.

Patent specification U.S. Pat. No. 5,479,171 likewise discloses a device of a similar nature for the inductive transmission of energy or data from a primary circuit via an intermediate circuit to a secondary circuit. This specification seeks to design the circuits in such a way that the quality factors of both the intermediate circuit and the secondary circuit are as high as possible so that data and energy can be transmitted from the base station to the transponder and back as effectively as possible. This approach recognizes the fact that any detuning or damping of the secondary circuit has an unfavorable effect on the read area of the transponder.

The intermediate circuit has an antenna coupling coil that is joined to the antenna by a conductive coupling to improve the connection.

SUMMARY OF THE INVENTION

The object of the present invention is to provide a device for the inductive transmission of energy and/or data from a primary circuit via an intermediate circuit to a secondary circuit and back in which data or energy is transmitted as effectively as possible.

This object can be achieved according to the invention by a device for the inductive transmission of energy and/or data from a primary circuit, comprising at least one transmitting and receiving antenna, to a secondary circuit, comprising a tuned circuit comprising at least one secondary coil and one capacitor, wherein between the primary circuit and the secondary circuit there is arranged an inductive intermediate circuit comprising an antenna that is inductively coupled via a coupling element to both the primary circuit and the secondary circuit, wherein an additional leakage inductor that is inductively decoupled from the secondary coil is arranged in the secondary circuit, and/or the coupling element has a leakage branch, the magnetic flux of which is not at the same time the coupling flux of the secondary circuit and of the intermediate circuit, whereby the inductive coupling between the intermediate circuit and the secondary circuit is reduced, but the overall effectiveness of transmission from the primary circuit to the secondary circuit is improved.

The coupling element can be formed by a leakage transfer core having at least one coupling branch and one leakage branch, wherein the magnetic flux of the leakage branch is not at the same time inductively coupled with the secondary coil and the antenna. The leakage transfer core can be manufactured from a permeable material. The primary circuit and the secondary circuit can be designed for the inductive transmission of energy or data in a tire pressure measurement system of a motor vehicle, wherein the primary circuit is arranged onboard the vehicle and the intermediate circuit and the secondary circuit are arranged onboard the tire.

The invention attempts not to improve the quality factor of an intermediate circuit, but rather specifically to reduce the inductive coupling between two circuits and thereby lessen the damping of one of the circuits. The inductive coupling between the intermediate circuit and the secondary circuit is reduced here by an additional leakage inductor introduced into the secondary circuit. The leakage inductor is here inductively decoupled from a secondary coil. The inductive coupling with the secondary circuit can also be reduced by a specially designed coupling element. The coupling element for this purpose has a leakage branch, the magnetic flux of which is not at the same time the coupling flux of both the secondary circuit and the intermediate circuit.

This has the advantage that the overall effectiveness of transmission from the primary circuit to the secondary circuit is improved. Particularly beneficially is the fact that in this arrangement, the voltage at the output of the secondary circuit is higher given the same input voltage despite the reduced inductive coupling between the intermediate circuit and the secondary circuit. Reducing the inductive coupling means that changes caused by external influences such as temperature have less of an effect on the quality factor or inductance in the secondary circuit. Data or energy can thus be transmitted reliably even in the case of relatively large tolerance variations.

Advantageous developments of the invention are disclosed in the dependent claims. The coupling element can accordingly be formed by a leakage transfer core having at least one coupling branch and one leakage branch, it being the case that the magnetic flux of the leakage branch is not at the same time inductively coupled with the secondary coil and the intermediate circuit.

A coupling element manufactured from a permeable material, preferably a highly permeable material, provides good reduction of the inductive coupling between the intermediate circuit and the secondary circuit.

The cross sections and permeability of the material can be adjusted by means of design measures to produce a specific level of leakage inductance and thereby precisely control the inductive matching of the coupling.

The inductive coupling of the intermediate circuit and the secondary circuit is thus made worse, but the overall transmission properties from the primary circuit to the secondary circuit improve.

A device of this type is preferably used for a tire pressure measurement system of a motor vehicle. The primary circuit in such a case is located onboard the vehicle close to each of the wheels. The intermediate circuit and the secondary circuit are arranged in the tire. Identification data relating to the tire, tire pressure or temperature values and other data can be interrogated from the transponder in the tire by means of the inductive transmission of energy and/or data.

The device for the inductive transmission of energy and/or data may be used in any application in which energy and/or data is transmitted from a primary circuit via an intermediate circuit to a secondary circuit. The invention is used in particular in cases where the positions of the intermediate circuit and the secondary circuit can vary with respect to the primary circuit and the intermediate circuit has a low quality factor.

BRIEF DESCRIPTION OF THE DRAWINGS

Exemplary embodiments of the invention are explained in greater detail below with reference to the schematic drawings.

DETAILED DESCRIPTION OF THE PREFERRED EMBODIMENTS

A device according to the invention serves to enable the inductive transmission of energy and/or data from a primary circuit 1 (FIG. 1) via an intermediate circuit 2 to a secondary circuit 3 and the return transmission of data to the primary circuit 1. The data may be encoded or encrypted for transmission. Transmission preferably takes place in the AF range, for example at 125 kHz.

Figure 1:
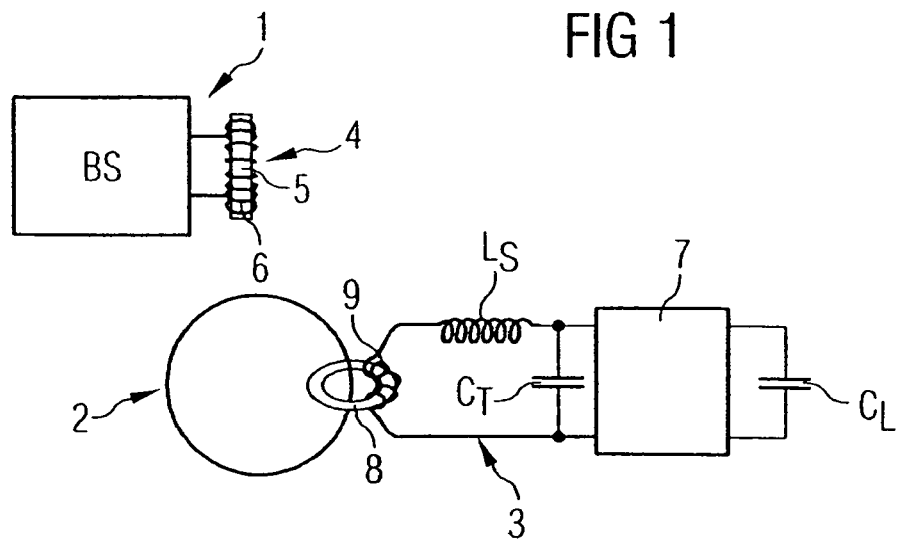
FIG. 1 shows a block diagram of a device according to the invention for the inductive transmission of energy and/or data.

The primary circuit 1 (also referred to as the base station) as per FIG. 1 has an antenna 4 formed by a coil 6 (also referred to as the primary coil) wound around a core 5. The base station transmits data or energy by means of induction using a modulation process and receives data by means of induction.

Energy or data is transmitted from the base station via an intermediate circuit 2 to a secondary circuit 3 by means of induction. The intermediate circuit 2 here serves merely as a transmitting/receiving antenna for the secondary circuit 3. A coupling element between the intermediate circuit 2 and the secondary circuit 3 serves as the medium for the transmission of energy or data between the two circuits. The coupling element is realized in FIG. 1 as a permeable toroidal core 8.

The signals received by the secondary circuit 3 are sent to a transponder-IC 7, which evaluates data and preprocesses data from its side ready for return transmission. The secondary circuit 3 and the intermediate circuit 2 together are therefore also referred to as a transponder.

The intermediate circuit 2 is advantageously realized as a closed circuit coil 16 (that is to say a coil having just one winding that is short circuited) and serves as the antenna for receiving or transmitting base station energy and/or data and as the means of passing on energy or data to the secondary circuit 3 using an inductive connection.

The intermediate circuit 2 is coupled to the secondary circuit 3 via the coupling element by means of induction. The coupling element here is advantageously the magnetic toroidal core 8, one side of which penetrates into the closed circuit coil 16 and thus picks up the magnetic field thereof. Wound around the other side of the toroidal core 8 is a secondary coil 9 that forms a part of the secondary circuit 3. The secondary coil 9 forms a tuned circuit of the secondary circuit 3 together with a capacitor $C_T$. The toroidal core 8 establishes an inductive connection between the intermediate circuit 2 and the secondary coil 9 via which data or energy can be transmitted.

The secondary circuit 3 is connected to the transponder-IC 7 in which the data or energy received is evaluated and the data to be sent is preprocessed. An energy store (in this case a charging capacitor $C_L$) is charged or recharged with the energy received and this energy is then subsequently used for the evaluation of signals received and the preprocessing and return transmission of the data. The transponder thus needs no independent energy supply in the form of a battery.

The intermediate circuit 2 has only a very low quality factor, for example as a result of the material used. The inductive coupling of the intermediate circuit 2 via the coupling element (toroidal core 8) to the secondary circuit 3 transfers this low quality factor to the secondary circuit 3. This decline in the quality factor degrades the transmission of data or energy between the two.

The invention provides for the inductive coupling between the intermediate circuit 2 and the secondary circuit 3 to be reduced to a specific target level in order to improve the effectiveness of transmission overall from the primary circuit 1 to the secondary circuit 3. This is explained in more detail below.

The invention aims to reduce the coupling of the intermediate circuit 2 to the secondary circuit 3. It also aims to achieve the highest possible level of voltage transmission so that the energy store is well charged ready to provide the energy for the return transmission of data and to stabilize the service inductivities and performance in the secondary circuit 3 against fluctuations in relevant parameters during operation of the device.

This can be achieved by inserting into the secondary circuit 3 a leakage inductor $L_s$, which does reduce the inductive coupling between the intermediate circuit 2 and the secondary circuit 3, but also optimizes the transmission behavior.

Figure 2A:
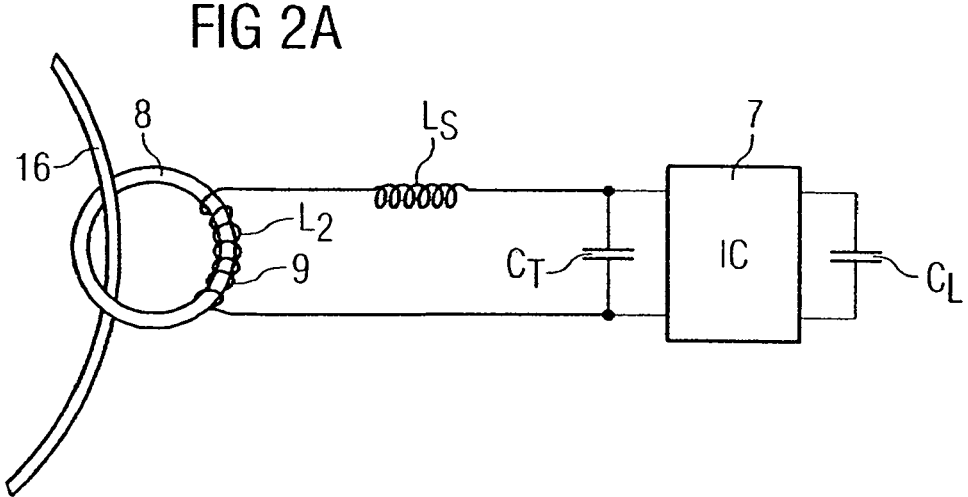
FIGS. 2A and 2B show exemplary embodiments of a secondary circuit of the device in accordance with FIG. 1.

The additional leakage inductor $L_s$ can be formed as shown in FIG. 2A by a leakage inductor $L_s$ that is inductively decoupled from the secondary coil 9 (having inductivity $L_2$) and is arranged in series with the secondary coil 9. The leakage inductor $L_s$ is not inductively coupled with the toroidal core 8, but nevertheless reduces the inductive coupling indirectly as a result of the fact that it is arranged in series with the secondary coil 9 and thereby influences the transmission properties of the tuned circuit.

Figure 2B:
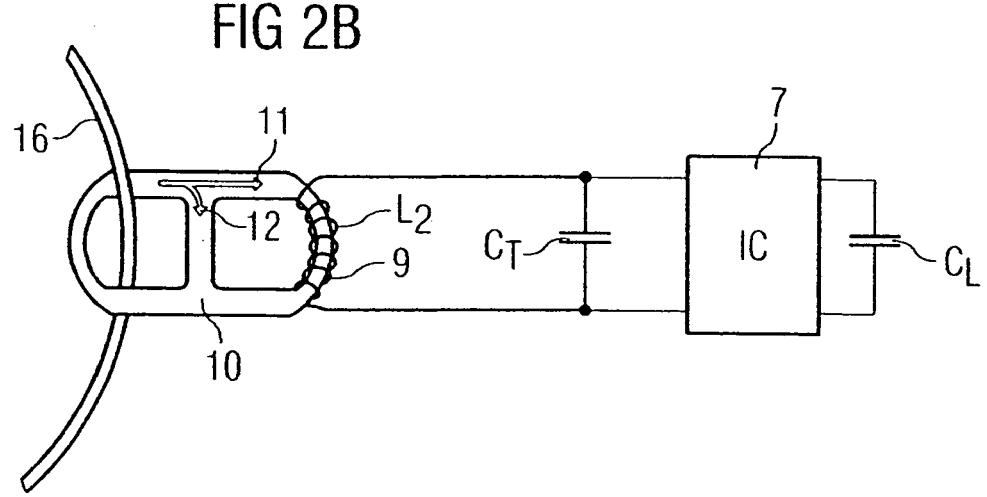

The coupling element may be realized as a specially designed leakage transfer core 10 (FIG. 2B). This may be done irrespective of whether or not the leakage inductor $L_s$ is inserted. The leakage transfer core 10 here has a coupling branch 11 and a leakage branch 12 (realized here as a two-hole core having a central web as leakage branch 12). The magnetic flux through the leakage branch 12 is not at the same time linked with the intermediate circuit 2 and the secondary circuit 3. This magnetic flux thus represents a specifically introduced leakage flux through which the inductive coupling is degraded. This is so because only the magnetic flux through the coupling circuit is linked with both the closed circuit coil 16 and the secondary coil 9; the leakage branch 12 is not linked. This has the effect of reducing the inductive coupling. The leakage branch 12 is thus also in effect a leakage inductor additionally introduced into the secondary circuit 3.

The ratio of coupling flux to leakage flux thus represents a measure of the reduction of the magnetic/inductive coupling between the intermediate circuit 2 and the secondary circuit 3. Careful dimensioning of the leakage flux, that is to say by means of the geometric design, for example, of the core cross sections of the leakage transfer core 10 or the permeability of the material used, can reduce the inductive coupling in such a way as to achieve an optimal outcome for transmission overall.

The inductive coupling between the intermediate circuit 2 and the secondary circuit 3 is reduced by this means. Since, however, the intermediate circuit 2 has only a very low quality factor, reducing the inductive coupling also has the effect of reducing the damping of the secondary circuit 3 and thus brings about an improvement in the overall transmission properties as demonstrated in substantial detail below with reference to FIGS. 3A to 3B.

The leakage transfer core 10 and/or the toroidal core 8 are advantageously manufactured from a highly permeable material. The required level of inductance can be achieved by means of a corresponding number of windings depending on the permeability and cross section of the cores.

The two exemplary embodiments in accordance with FIGS. 2A and 2B can also be combined in such a way that both a leakage inductor $L_s$ and a leakage transfer core 10 are provided, it being the case here that the two together are dimensioned such that the inductive coupling is reduced to the extent that optimal transmission behavior results.

Figure 3A:
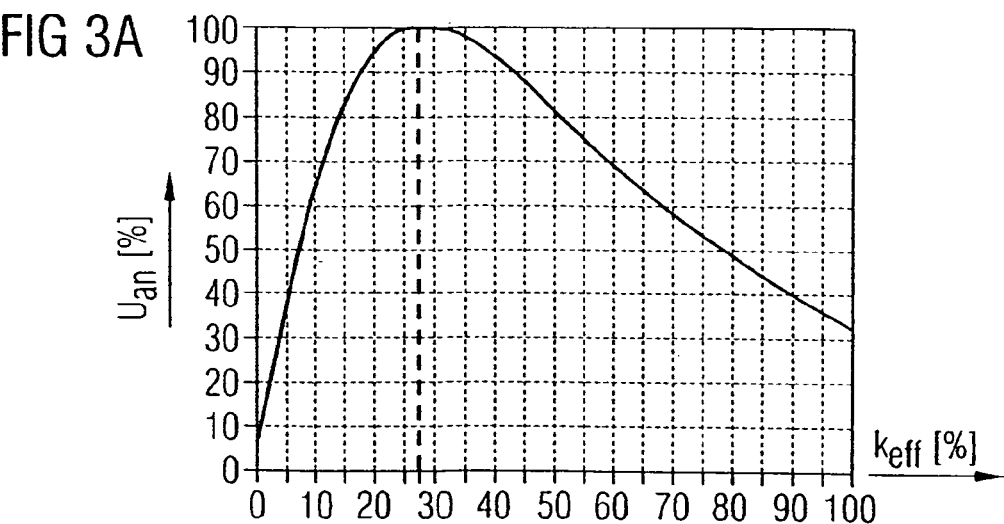
FIGS. 3A to 3C show performance quantities of the primary circuit in accordance with FIGS. 2A and 2B.
Figure 3B:
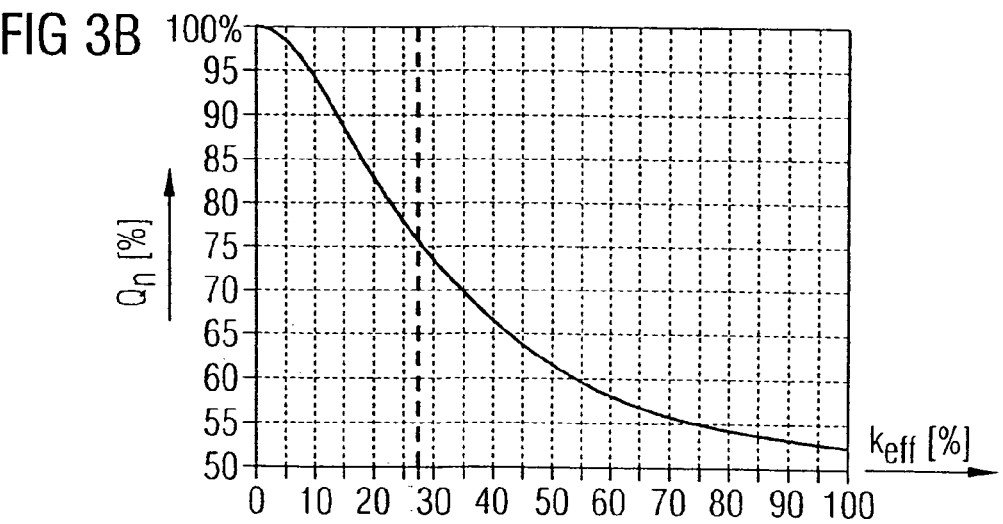
Figure 3C:
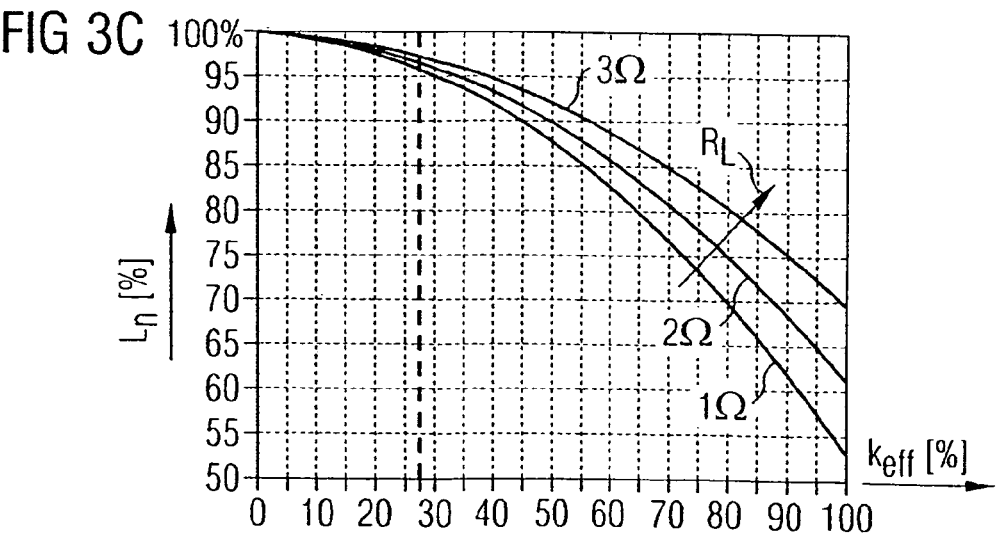

FIGS. 3A to 3C show performance quantities of the transponder circuit as a whole, that is to say of the intermediate circuit 2 and secondary circuit 3. FIG. 3A shows the nominal output voltage $U_{an}$ present at the output of the secondary circuit 3, that is to say the voltage parallel to the tuned circuit capacitor $C_T$ as a function of an effective coupling factor $k_{eff}$. The effective coupling factor $k_{eff}$ can be calculated as follows:

$$k_{eff} = \sqrt{\frac{L_2}{L_2 + L_s}},$$

where $L_2$ is equal to the inductivity coefficient $A_L$ of the toroidal core times the corresponding number of windings of the closed circuit coil 16 (n=1) or of the secondary coil (n>1) squared ($n^2$) and $L_s$ is equal to the additional leakage inductance.

If $k_{eff}$=0%, the transponder circuit as a whole has a nominal output voltage $U_{an}$ of 0%. The nominal secondary inductance in this case is $L_2$=100%. If $k_{eff}$=1 (or 100%), the output voltage equals approximately 33%. A maximum nominal output voltage $U_{an}$ of 100% is achieved at $k_{eff} \approx 27.5\%$.

Since it is the aim of the invention to maximize the voltage transmission, the leakage inductor (and/or the leakage transfer core 10) is realized in such a way as to achieve this effective coupling factor of approximately $k_{eff}$=27.5%.

$$L_S = L_2 \left( \frac{1}{k_{eff}^2} - 1 \right)$$

The nominal performance $Q_n$ of the transponder circuit according to FIG. 3B achieves its highest value at $k_{eff}$=0% and its lowest value at $k_{eff}$=100%. The performance figure $Q_n$ is still above 50% when $k_{eff} \approx 27.5\%$, so the quality factor for the tuned circuit as a whole is still perfectly adequate.

The nominal working inductance $L_n$ (FIG. 3C) is largest ($L_n$=100%) at a coupling factor of 0% and decreases as the coupling factor $k_{eff}$ rises. The working inductance $L_n$ depends on multiple factors including the ohmic resistance $R_L$ and the inductance L of the closed circuit coil 16. The dependence of the working inductance $L_n$ on the resistance $R_L$ of the closed circuit coil 16 is shown in FIG. 3C. The working inductance $L_n$ grows larger as the resistance value $R_L$ increases (the curves shown are for resistance values $R_L$=1 Ω, 2 Ω and 3 Ω). The working inductance $L_n$ does, however, remain virtually the same up to $k_{eff}$=27.5%. The resistance value $R_L$ of the closed circuit coil 16 depends essentially on the material used and the geometric dimensions of the closed circuit coil 16. The choice of material is determined essentially by the nature of the application for which the closed circuit coil 16 is to be used.

FIG. 3C shows that the working inductance hardly varies at all at the effective coupling factor $k_{eff}$ of 27.5% even with considerable changes in the resistance value $R_L$ of the closed circuit coil 16. Consequently, production-related tolerance variations and external influences such as temperature-induced changes in resistance have almost no impact on the system as a whole with this coupling factor. The effective coupling factor $k_{eff}$ of 27.5% thus here represents an optimal coupling factor from which the appropriate leakage inductor $L_s$ or leakage transfer core can be calculated and dimensioned so as to stabilize the working inductance and improve the overall transmission of data or energy.

The use of the device according to the invention in a tire pressure measurement system for a motor vehicle is explained in greater detail with reference to FIGS. 4 to 6. Parts having the same functions carry the same reference numbers in FIGS. 4 to 6 as in FIGS. 1 and 2.

Figure 4:
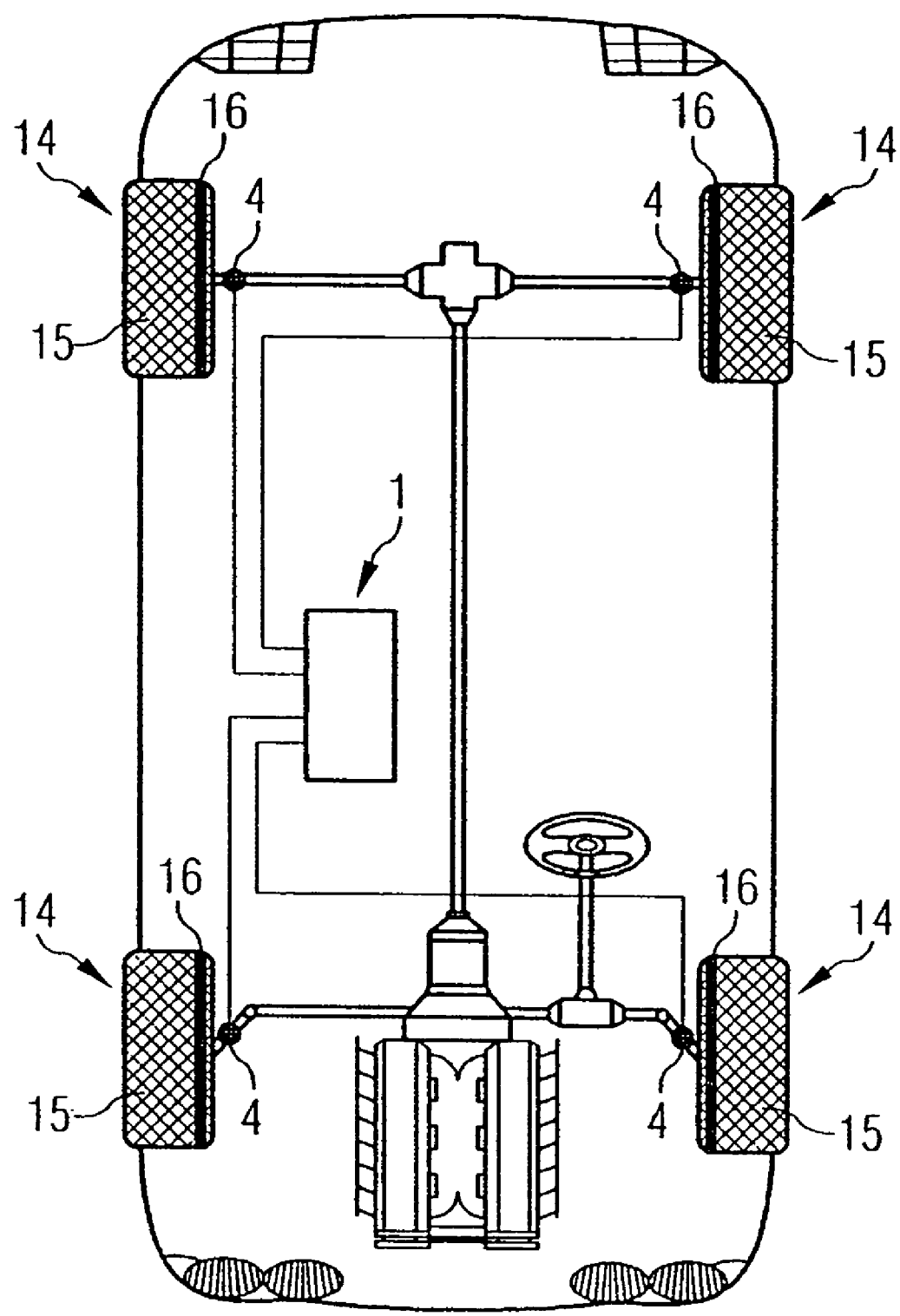
FIG. 4 shows an example of the device in use in a tire pressure measurement system of a motor vehicle.
Figure 5:
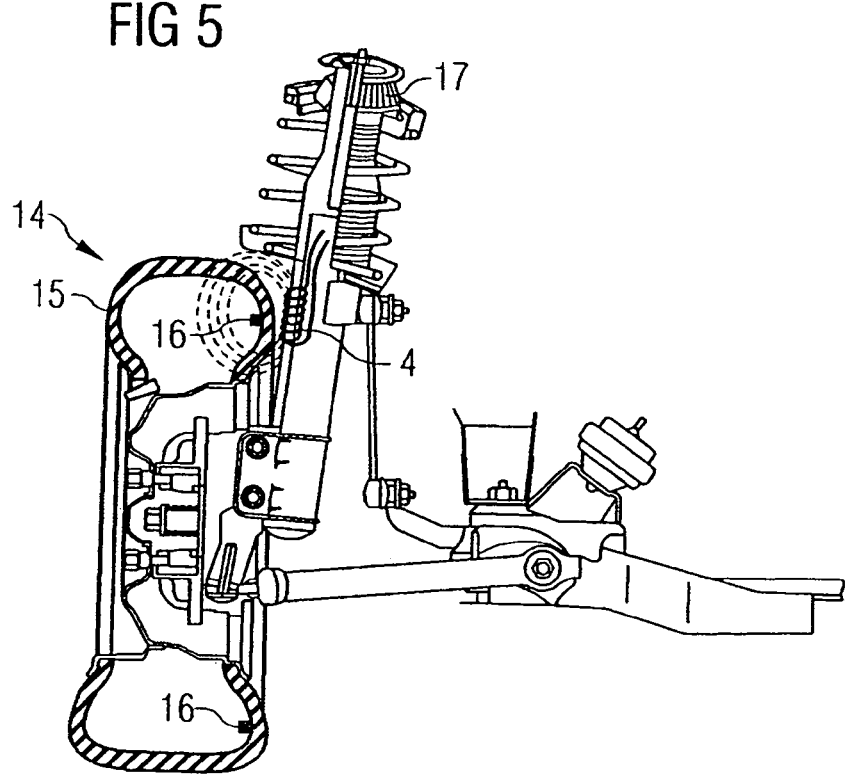
FIG. 5 shows an arrangement of the device in a tire of a motor vehicle.

Energy signals are sent from a base station (primary circuit 1) to transponders in the tires 15 via an antenna 4 positioned in the vicinity of each of the wheels 14 (FIG. 4). Each transponder uses the energy received to measure the pressure or the temperature in the tire 15 and send the result back to the base station in a data signal. The pressure values can be presented to the driver for each wheel position and in particular the driver can be alerted by an alarm signal if a tire suffers an unacceptably significant loss of pressure or reaches an excessive pressure or temperature.

The closed circuit coil 16 is arranged inside of or within the rubber of each tire 15 of the motor vehicle as the transmitting and receiving antenna. The closed circuit coil 16 is inductively coupled to the secondary circuit 3 via the toroidal core 8. An antenna 4 of the base station is assigned spatially to each closed circuit coil 16 so as to permit the best possible transmission. The antenna 4 is, for example, attached to the MacPherson strut unit 17 (FIG. 5) at the height of the closed circuit coil 16 so that energy and/or data from the primary circuit 1 are launched effectively into the closed circuit coil 16. This means that each antenna 4 is the same distance, namely the shortest possible distance, from the closed circuit coil 16 assigned in each case even when the wheel is turning. The voltage induced in the closed circuit coil 16 by the magnetic field of the antenna 4 on the vehicle side is always the same in this arrangement irrespective of the revolution of the wheel and the same current flows at every angle of rotation of the wheel.

The closed circuit coil 16 is advantageously manufactured in steel (and is therefore also referred to as a steel ring) so that it is strong enough not break even under extreme loads such as are encountered during flexion of the tire. The steel ring in such cases is attached on the inside of that side wall of the tire 15 or in the tire material on the side that faces toward the MacPherson strut unit 17 and thus toward the antenna 4 of the base station.

The antenna 4 of the base station is wound as a coil on a high permeability ferrite core 5 to permit the most effective possible transmission of energy or data. The ferrite core 5 is arranged approximately parallel to the winding surface of the steel ring such that the magnetic field (field lines are indicated for reference in FIG. 5 by dashed lines) of the antenna 4 interacts effectively with the closed circuit coil 16.

Figure 6:
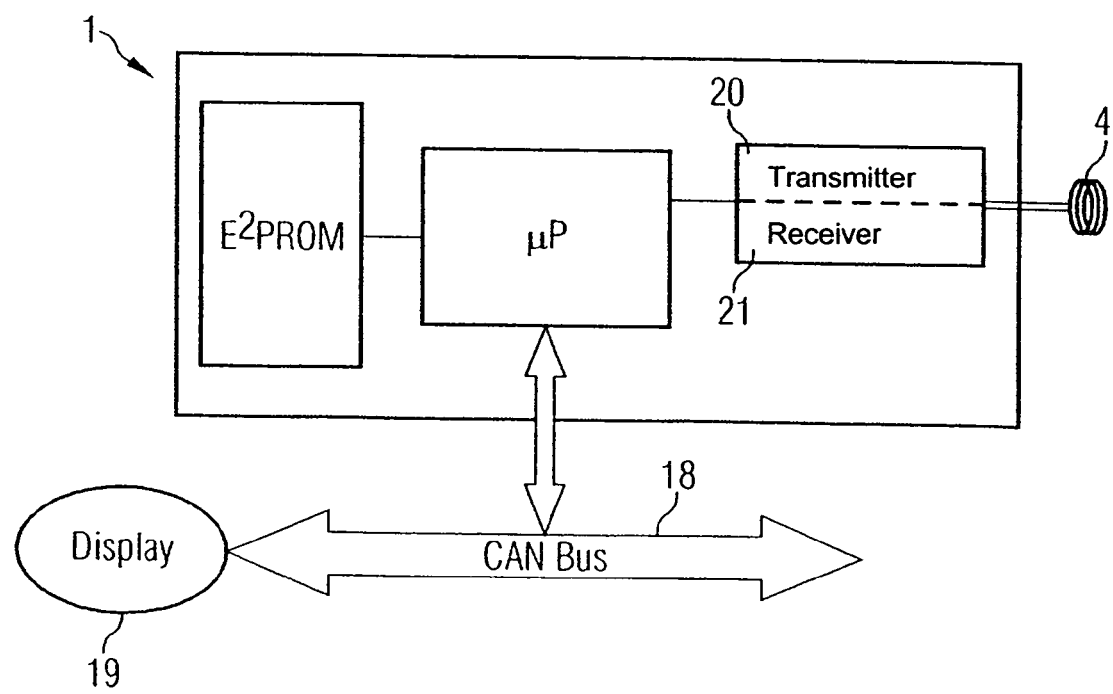
FIG. 6 shows a block diagram of a base station (primary circuit) of the device.

The base station is shown in detail in FIG. 6. The base station receives the signals transmitted by each transponder via a multiplicity of antennas assigned to the wheels. Each antenna 4 carries the signal received in each case via a receiver to a microprocessor μP. The data demodulated from the signal (such as tire pressure, temperature in the tire or tire identification) is passed on to the microprocessor μP.

The microprocessor μP is connected to a data memory E²PROM. This memory E²PROM can be used to store target or reference values for tire inflation pressure (minimum and/or maximum permitted pressure values), reference temperature, allocations of identifications to wheel positions, etc.

The base station may be connected to other electronic units in the motor vehicle via a motor vehicle data bus 18 such as, for example, a CAN bus.

The measured pressure values can be compared with target values before they even leave the tire 15. This comparison can also be carried out in the base station, it being the case that the target or reference values are stored in the memory E²PROM. If a measured value exceeds or falls short of a target value, a message or warning can be sent to the driver via the bus 18 by indicating the corresponding information acoustically and/or optically by means of a display unit 19.

If a measured value exceeds or falls short of a reference pressure value, a warning signal is sent that notifies the driver of the respective wheel position at which a tire 15 has an excessively low or high pressure.

The display unit 19 is advantageously arranged in the field of view of the driver, for example on the instrument board.

The base station has a transmitter 20 and a receiver 21 with the aid of which data or energy can be sent via one or more antennas 4 to the individual transponders in the tires 15 and also received therefrom. Transmission and reception are advantageously carried out in each case via an antenna 4, which is assigned in each case to a wheel position with a tire 15 and to the transponder located therein.

Each inductor (impedance) additionally incorporated into the secondary circuit 3 that effects a specific reduction in the inductive coupling between the intermediate circuit 2 and the secondary circuit 3 and thus reduces the damping of the secondary circuit 3 due to the lower quality factor of the intermediate circuit 2 can be regarded as a leakage inductor. This improves the overall transmission properties.

I claim:

1. A device for the inductive transmission of energy and/or data from a primary circuit, comprising at least one transmitting and receiving antenna, to a secondary circuit, comprising a tuned circuit comprising at least one secondary coil and one capacitor, wherein between the primary circuit and the secondary circuit there is arranged an inductive intermediate circuit comprising an antenna that is inductively coupled via a coupling element to both the primary circuit and the secondary circuit, wherein an additional leakage inductor that is inductively decoupled from the secondary coil is arranged in the secondary circuit, and/or the coupling element has a leakage branch, the magnetic flux of which is not at the same time the coupling flux of the secondary circuit and of the intermediate circuit, whereby the inductive coupling between the intermediate circuit and the secondary circuit is reduced, but the overall effectiveness of transmission from the primary circuit to the secondary circuit is improved.

2. The device according to claim 1, wherein the coupling element is formed by a leakage transfer core having at least one coupling branch and one leakage branch, wherein the magnetic flux of the leakage branch is not at the same time inductively coupled with the secondary coil and the antenna.

3. The device according to claim 1, wherein the leakage transfer core is manufactured from a permeable material.

4. The device according to claim 1, wherein the primary circuit and the secondary circuit are designed for the inductive transmission of energy or data in a tire pressure measurement system of a motor vehicle, wherein the primary circuit is arranged onboard the vehicle and the intermediate circuit and the secondary circuit are arranged onboard the tire.

5. An arrangement for transmitting energy and/or data from a primary circuit to a secondary circuit, comprising:
   at least one transmitting and receiving antenna in the primary circuit,
   a tuned circuit comprising at least one secondary coil and one capacitor in the secondary circuit,
   an inductive intermediate circuit, arranged the primary circuit and the secondary circuit, comprising an antenna that is inductively coupled via a coupling element to both the primary circuit and the secondary circuit,
   an additional leakage inductor inductively decoupled from the secondary coil and arranged in the secondary circuit, and wherein
   the coupling element has a leakage branch, wherein the magnetic flux of the leakage branch is not at the same time the coupling flux of the secondary circuit and of the intermediate circuit, whereby the inductive coupling between the intermediate circuit and the secondary circuit is reduced, but the overall effectiveness of transmission from the primary circuit to the secondary circuit is improved.

6. The arrangement according to claim 5, wherein the coupling element is formed by a leakage transfer core having at least one coupling branch and one leakage branch, wherein the magnetic flux of the leakage branch is not at the same time inductively coupled with the secondary coil and the antenna.

7. The arrangement according to claim 5, wherein the leakage transfer core is manufactured from a permeable material.

8. The arrangement according to claim 5, wherein the primary circuit and the secondary circuit are designed for the inductive transmission of energy or data in a tire pressure measurement system of a motor vehicle, wherein the primary circuit is arranged onboard the vehicle and the intermediate circuit and the secondary circuit are arranged onboard the tire.

9. An arrangement for transmitting energy and/or data from a primary circuit to a secondary circuit, comprising:
at least one transmitting and receiving antenna in the primary circuit,
a tuned circuit comprising at least one secondary coil and one capacitor in the secondary circuit,
an inductive intermediate circuit, arranged the primary circuit and the secondary circuit, comprising an antenna that is inductively coupled via a coupling element to both the primary circuit and the secondary circuit, wherein the coupling element has a leakage branch, wherein the magnetic flux of the leakage branch is not at the same time the coupling flux of the secondary circuit and of the intermediate circuit, whereby the inductive coupling between the intermediate circuit and the secondary circuit is reduced, but the overall effectiveness of transmission from the primary circuit to the secondary circuit is improved.

10. The arrangement according to claim 9, wherein the coupling element is formed by a leakage transfer core having at least one coupling branch and one leakage branch, wherein the magnetic flux of the leakage branch is not at the same time inductively coupled with the secondary coil and the antenna.

11. The arrangement according to claim 9, wherein the leakage transfer core is manufactured from a permeable material.

12. The arrangement according to claim 9, wherein the primary circuit and the secondary circuit are designed for the inductive transmission of energy or data in a tire pressure measurement system of a motor vehicle, wherein the primary circuit is arranged onboard the vehicle and the intermediate circuit and the secondary circuit are arranged onboard the tire.

* * * * *